United States Patent
Li

(10) Patent No.: US 11,487,164 B2
(45) Date of Patent: Nov. 1, 2022

(54) SUBSTRATE OF DISPLAY PANEL, MANUFACTURING METHOD THEREFOR AND DISPLAY DEVICE

(71) Applicants: BEIHAI HUIKE PHOTOELECTRIC TECHNOLOGY CO., LTD., Beihai (CN); CHONGQING HKC OPTOELECTRONICS TECHNOLOGY CO., LTD., Chongqing (CN)

(72) Inventor: Zeyao Li, Chongqing (CN)

(73) Assignees: BEIHAI HUIKE PHOTOELECTRIC TECHNOLOGY CO., LTD., Beihai (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/289,750

(22) PCT Filed: Mar. 25, 2020

(86) PCT No.: PCT/CN2020/081101
§ 371 (c)(1),
(2) Date: Apr. 29, 2021

(87) PCT Pub. No.: WO2020/207246
PCT Pub. Date: Oct. 15, 2020

(65) Prior Publication Data
US 2021/0397028 A1    Dec. 23, 2021

(30) Foreign Application Priority Data
Apr. 8, 2019    (CN) .......................... 201910275199.1

(51) Int. Cl.
*G02F 1/1339* (2006.01)
*G02F 1/1335* (2006.01)

(52) U.S. Cl.
CPC ...... *G02F 1/1339* (2013.01); *G02F 1/133512* (2013.01); *G02F 1/133514* (2013.01)

(58) Field of Classification Search
None
See application file for complete search history.

(56) References Cited

U.S. PATENT DOCUMENTS

2011/0013125 A1*  1/2011  Lee .................. G02F 1/133711
                                                        156/182
2017/0090226 A1*  3/2017  Oh ........................ G02F 1/1339

FOREIGN PATENT DOCUMENTS

CN        101290417 A   *  10/2008
CN        101290417 A      10/2008
(Continued)

OTHER PUBLICATIONS

Guobin Li, the ISA written comments, Jun. 2020, CN.
Guobin Li,, the International Search Report, dated Jun. 2020. CN.

*Primary Examiner* — Shan Liu

(57) ABSTRACT

The present application discloses a substrate of a display panel, a manufacturing method therefor and a display device. The substrate of the display panel includes a substratum, a shading layer and a plurality of retaining walls with different heights, where the shading layer is located in a non-display area of the substratum, the retaining walls are arranged on the shading layer in a direction parallel to a sealant coating direction of the display panel, and the plurality of retaining walls are connected in a laminated manner.

14 Claims, 4 Drawing Sheets

(56) References Cited

FOREIGN PATENT DOCUMENTS

| | | | | | |
|---|---|---|---|---|---|
| CN | 103149729 | A | * | 6/2013 | ......... G02F 1/13394 |
| CN | 104166270 | A | * | 11/2014 | |
| CN | 104166270 | A | | 11/2014 | |
| CN | 105739185 | A | * | 7/2016 | |
| CN | 105739185 | A | | 7/2016 | |
| CN | 107219658 | A | | 9/2017 | |
| CN | 107608144 | A | | 1/2018 | |
| CN | 109491150 | A | * | 3/2019 | |
| CN | 109491150 | A | | 3/2019 | |
| CN | 110109286 | A | | 8/2019 | |
| CN | 110174789 | A | | 8/2019 | |
| CN | 110174790 | A | | 8/2019 | |
| JP | 2008039955 | A | | 2/2008 | |

\* cited by examiner

SUBSTRATE OF DISPLAY PANEL, MANUFACTURING METHOD THEREFOR AND DISPLAY DEVICE

CROSS REFERENCE OF RELATED APPLICATIONS

The present application claims the priority to the Chinese Patent Application No. CN201910275199.1, filed to National Intellectual Property Administration, PRC on Apr. 8, 2019 and entitled "SUBSTRATE OF DISPLAY PANEL, MANUFACTURING METHOD THEREFOR AND DISPLAY DEVICE", which is incorporated herein by reference in its entirety.

TECHNICAL FIELD

The present application relates to the field of display technologies, particularly to a substrate of a display panel, a manufacturing method therefor and a display device.

BACKGROUND

The statements herein merely provide background information related to the present application and do not necessarily constitute the conventional art.

In a Thin Film Transistor Liquid Crystal Display (TFT-LCD), a display panel mainly includes a color filter substrate, an array substrate, and a liquid crystal layer filled between the two substrates. The two substrates are arranged with alignment films, liquid crystals can be aligned along grooves on the alignment films, and the liquid crystals are controlled by an electric field to form a display picture. The two substrates are fixedly installed by a sealant. A layer of alignment liquid is usually coated on the substrate to form a pretilt angle, which is beneficial for the liquid crystal to have a fixed tilting direction during displaying. The alignment liquid is a chemical liquid with fluidity, and will diffuse and flow to the non-display area after coating, so retaining walls are arranged at the edge of alignment liquid coating range to prevent the alignment liquid from exceeding the sealant edge.

When the alignment liquid reaches the retaining wall, backflow accumulation occurs, which causes increase of the thickness of the alignment liquid, uneven display, or falling off of the sealant when flowing to the sealant.

SUMMARY

The purpose of the present application is to provide a substrate of a display panel, a manufacturing method therefor and a display device so as to prevent an alignment liquid from backflowing and flowing to the sealant.

The present application discloses a substrate of a display panel, including a substrate, a shading layer arranged on the substratum and located in a non-display area of the substratum, and a plurality of retaining walls arranged on the shading layer in a direction parallel to a sealant coating direction of the display panel, where the plurality of retaining walls are connected in a laminated manner, and any two adjacent retaining walls in a direction in which the retaining walls are arranged have different heights.

The present application also discloses a display device, including a sealant and a substrate of a display panel; the substrate includes a substrate, a shading layer arranged on the substratum and located in a non-display area of the substratum, and a plurality of retaining walls arranged on the shading layer in a direction parallel to a sealant coating direction of the display panel, where the plurality of retaining walls are connected in a laminated manner, any two adjacent retaining walls in a direction in which the retaining walls are arranged have different heights, the substrate includes a color filter substrate and an array substrate, and the color filter substrate and the array substrate are paired by the sealant.

The present application also discloses a manufacturing method for a substrate, including steps of:

arranging a shading layer on a non-display area of a substratum; and arranging a plurality of retaining walls with different heights on the shading layer in a direction parallel to a sealant coating direction of a display panel, where the plurality of retaining walls are connected in a laminated manner.

According to the present application, the retaining walls with different heights are arranged in the direction parallel to the sealant coating direction of the display panel, so that when the retaining walls can block the alignment liquid, all positions can be blocked, which prevents the sealant from falling off due to overflowing of alignment liquid to the sealant; when the retaining walls can not block the alignment liquid, the alignment liquid can overflow from shorter retaining wall, which cause that the alignment liquid can uniformly overflow.

BRIEF DESCRIPTION OF DRAWINGS

The accompanying drawings, which are included to provide a further understanding of embodiments of the present application and constitute a part of the specification, illustrate embodiments of the application and, together with the text description, explain the principles of the application. Obviously, the drawings in the following description are merely some embodiments of the present application, and those skilled in the art can obtain other drawings according to the drawings without any inventive labor. In the drawings.

DETAILED DESCRIPTION OF EMBODIMENTS

It should be understood that the terminology, specific structural and functional details disclosed are merely exemplary for the purpose of describing specific embodiments. However, the present application may be embodied in many alternative forms and should not be construed as being limited to the embodiments set forth herein.

In the description of the present application, the terms "first" and "second" are only for the purpose of description and cannot be construed to indicate relative importance or imply an indication of the number of technical features indicated. Therefore, unless otherwise stated, a feature defined as "first" and "second" may explicitly or implicitly include one or more of the features; "multiple" means two or more. The term "include" and any variations thereof are intended to be inclusive in a non-closed manner, that is, the presence or addition of one or more other features, integers, steps, operations, units, components and/or combinations thereof may be possible.

In addition, the terms "center", "horizontally", "up", "down", "left", "right", "vertical", "horizontal", "top", "bottom", "inner", "outer" and the like for indicating an orientation or positional relationship are based on the description of the orientation or relative positional relationship shown in the accompanying drawings, and are only simplified description facilitating description of the application, and are not intended to indicate that the device or element referred to must have a particular orientation, be configured and operated in a particular orientation, and therefore cannot be construed as limiting the present application.

In addition, unless expressly specified and defined otherwise, the terms "mount", "attach" and "connect" are to be understood broadly, for example, it can be a fixed connection, a detachable connection, or an integral connection; it can be an either mechanical connection or an electrical connection; it can be a direct connection or an indirect connection through an intermediate medium, or an internal connection between two elements. For those skilled in the art, the specific meaning of the above terms in this application can be understood according to the specific circumstances.

Figure 1:
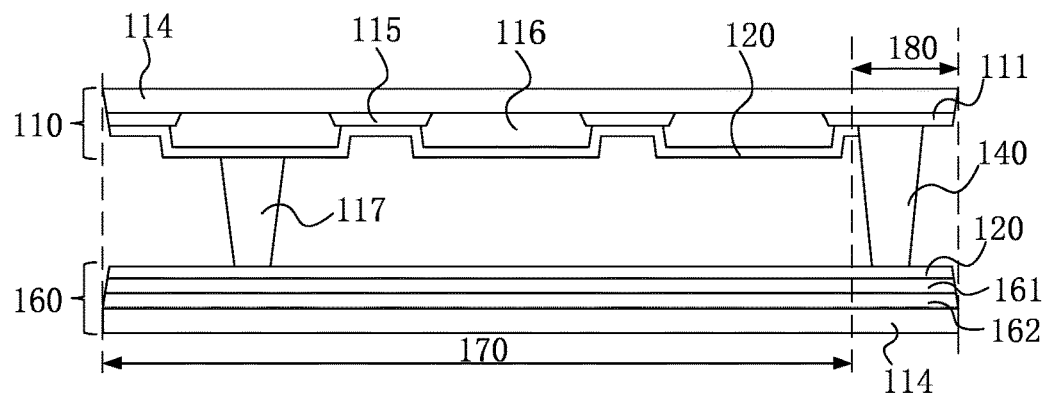
FIG. 1 is a schematic diagram of a cross-sectional structure of an exemplary display panel.

FIG. 1 is a schematic diagram of a cross-sectional structure of an exemplary display panel. As shown in FIG. 1, a display panel 100 includes an array substrate 160 and a color filter substrate 110, where the color filter substrate 110 includes a substratum 114, a black matrix 115 arranged in a display area 170 of the substratum 114, a color resist layer 116 arranged on the substrate 114 and between the black matrix 115, a shading layer 111 arranged in a non-display area 180 of the substratum 114, and retaining walls 140 arranged on the shading layer 111, and an alignment layer 120 arranged on a surface of the black matrix 115 and a surface of the color resist layer 116. The substrate includes a substratum 114, a metal layer 162 arranged on the substratum 114, an insulating layer 161 arranged on the metal layer 162, and an alignment layer 120 arranged on the insulating layer 161.

Figure 2:
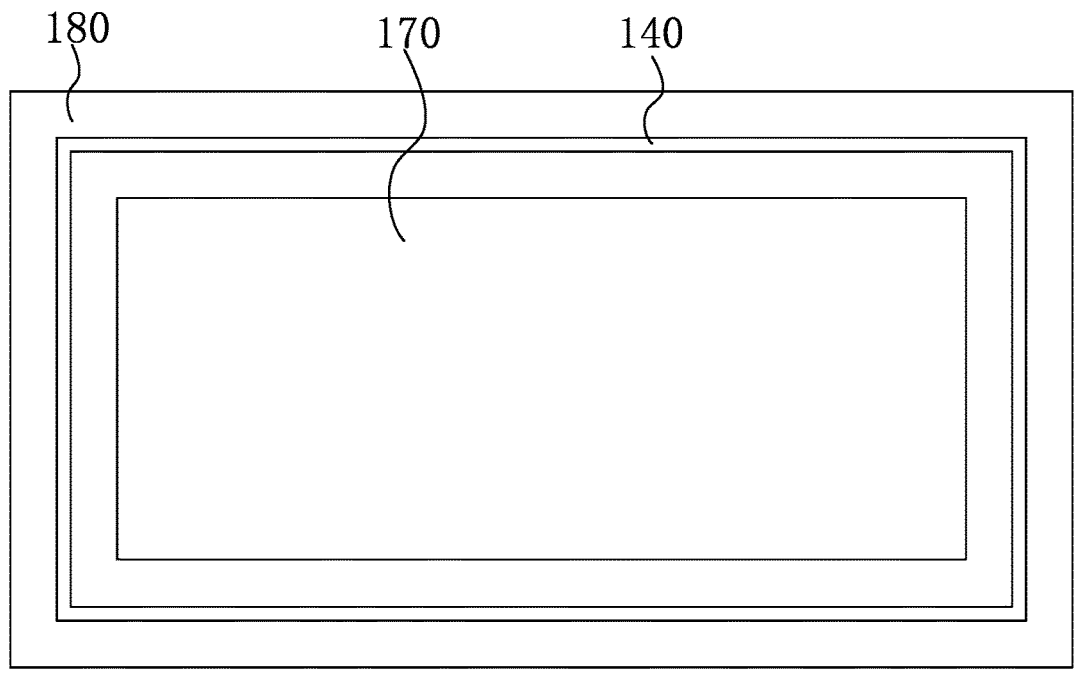
FIG. 2 is a schematic diagram of an exemplary retaining wall arrangement.
Figure 3:
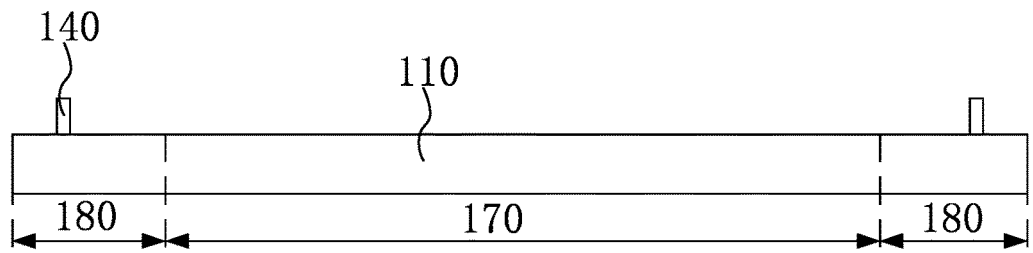
FIG. 3 is a schematic cross-sectional diagram of an exemplary retaining wall arrangement.

FIGS. 2 and 3 are schematic diagrams of an exemplary retaining wall arrangement. As shown in FIGS. 2 and 3, the retaining walls 140 are arranged within the non-display area 180 and arranged in a circle around the display area 170.

The present application will now be further described by reference to the accompanying drawings and optional embodiments.

Figure 4:
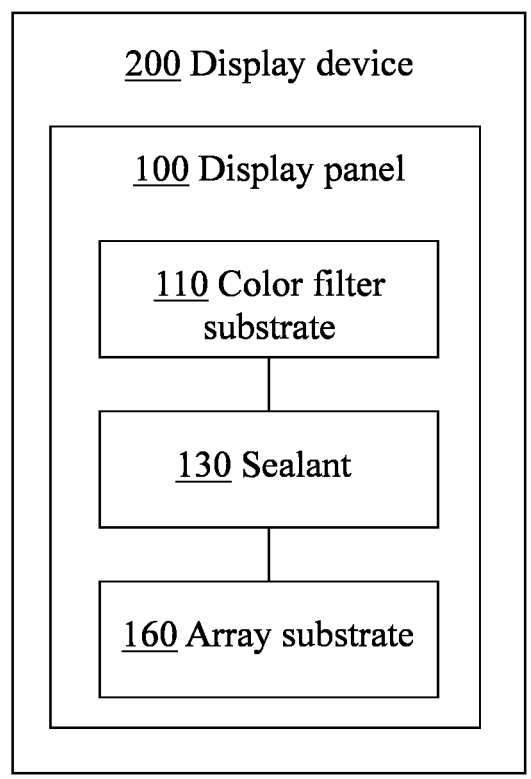
FIG. 4 is a schematic diagram of a display device according to an embodiment of the present application.

As shown in FIG. 4, an embodiment of the present application discloses a display device 200, where the display device 200 includes a sealant 130, and a substrate 190 described below; the substrate 190 includes a color filter substrate 110 and an array substrate 160, and the color filter substrate 110 and the array substrate 160 are paired by the sealant 130. The concept of the present application is further described below by taking the color filter substrate 110 as an example.

Figure 5:
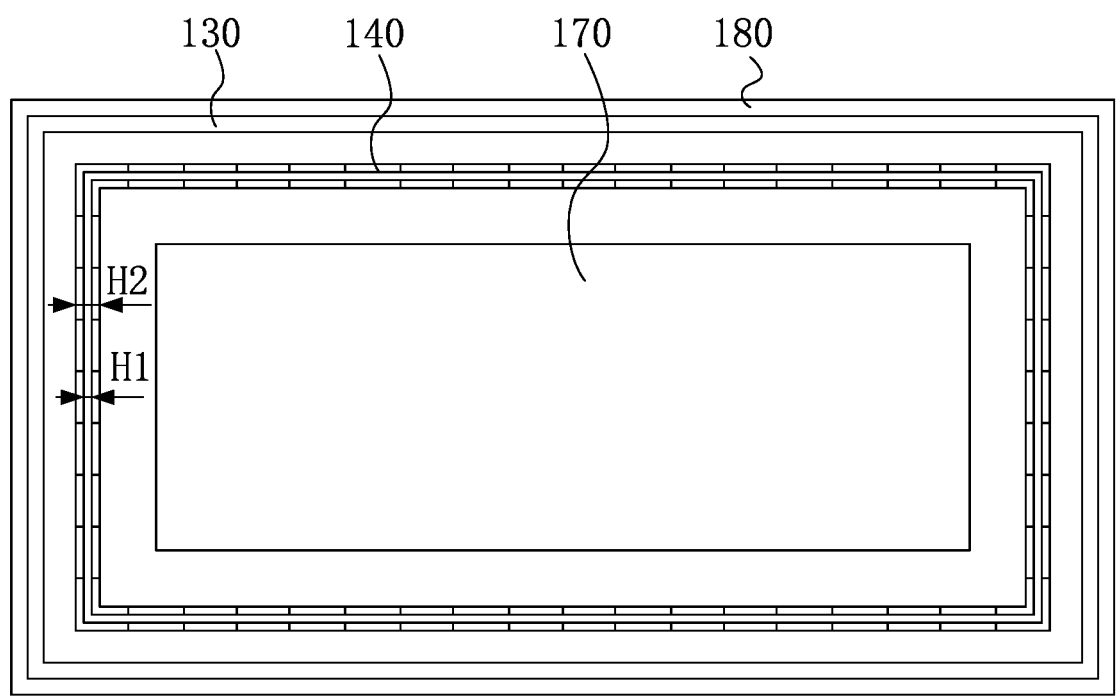
FIG. 5 is a schematic diagram of a retaining wall arrangement according to an embodiment of the present application.
Figure 6:
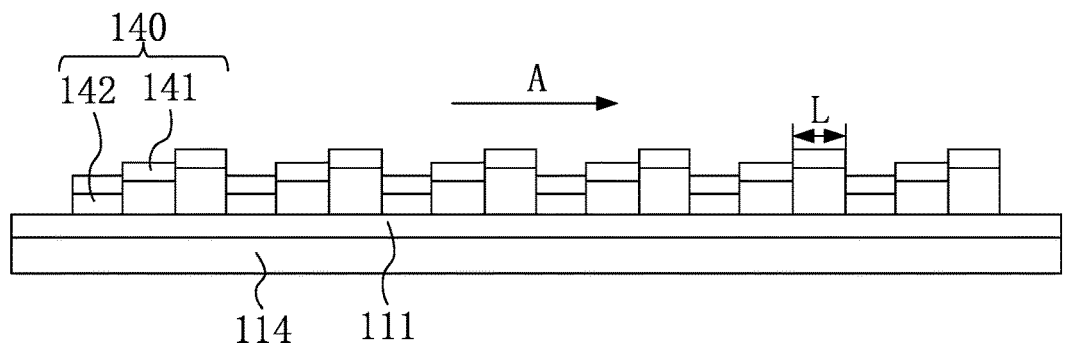
FIG. 6 is a schematic cross-sectional diagram of a retaining wall arrangement according to an embodiment of the present application.

As shown in FIG. 1, FIG. 5 and FIG. 6, the color filter substrate 110 includes a substratum 114 and a shading layer 111, the shading layer 111 is arranged on a non-display area 180 of the substratum 114, a plurality of retaining walls 140 with different heights are arranged on the shading layer 111 and configured to prevent an alignment liquid from overflowing, the plurality of retaining walls 140 are arranged parallel to a coating direction A of a sealant 130 of a display panel 100, and the plurality of retaining walls 140 are connected in a laminated manner and have an increasing height along the coating direction A of the sealant 130.

The retaining walls 140 with different heights are arranged in the direction parallel to the sealant 130 coating direction of the display panel 100, so that when the retaining walls 140 can block the alignment liquid, all positions can be blocked, which prevents the sealant 130 from falling off due to overflowing of alignment liquid to the sealant 130; when the retaining walls 140 can not block the alignment liquid, the alignment liquid can overflow from shorter retaining wall 140, which cause that the alignment liquid can uniformly overflow.

Specifically, the color filter substrate 110 includes a black matrix 115, a color resist layer 116 and a support column 117, the black matrix 115 is arranged within a display area 170 of the substratum 114, the color resist layer 116 is arranged on the black matrix 115, the support column 117 is arranged on the black matrix 115, the retaining wall 140 includes an upper layer structure 141 and a lower layer structure 142, the upper layer structure 141 and the support column 117 are made of the same material, the lower layer structure 142 and the color resist layer 116 are made of the same material, the color resist layer 116 includes color resists with different colors, three of the retaining walls 140 are in a group, the materials of the three retaining walls 140 sequentially correspond to a red color resist, a green color resist and a blue color resist, each color resist is connected in a laminated manner, the retaining walls 117 stacked on each color resist have the same heights and are connected in a laminated manner, the thickness H1 of the upper layer structure 141 is smaller than the thickness H2 of the lower layer structure 142, the width L of the upper layer structure 141 is equal to the width L of the lower layer structure 142, the direction of the thickness H is the flowing direction of the alignment liquid, the direction of the width L is the coating direction of the sealant 130, the lower layer structure 142 has a greater height than the upper layer structure 141, and the retaining walls 140 are arranged around the display area 170 along the coating direction of the sealant 130. The material of the lower layer structure 142 may also be the same as that of the upper layer structure 141, and the thickness H1 of the upper layer 141 may also be equal to the thickness H2 of the lower layer 142.

The retaining walls 140 with an increasing height are formed in such a way that blue color resist is higher than green color resist, green color resist is higher than red color resist, and are made of materials used in the manufacturing process of the display panel 100, which ensures that manufacturing is convenient; the color resists are connected in a laminated manner, the support columns 117 stacked on the color resists are also connected in a laminated manner, which prevents the sealant 130 from falling off due to the fact that the alignment liquid flows out from a gap between the retaining walls 140 to the sealant 130, and the upper layer structure 141 has a smaller stress and a low requirement in strength, so that the thickness H thereof is reduced, and materials are saved.

Figure 7:
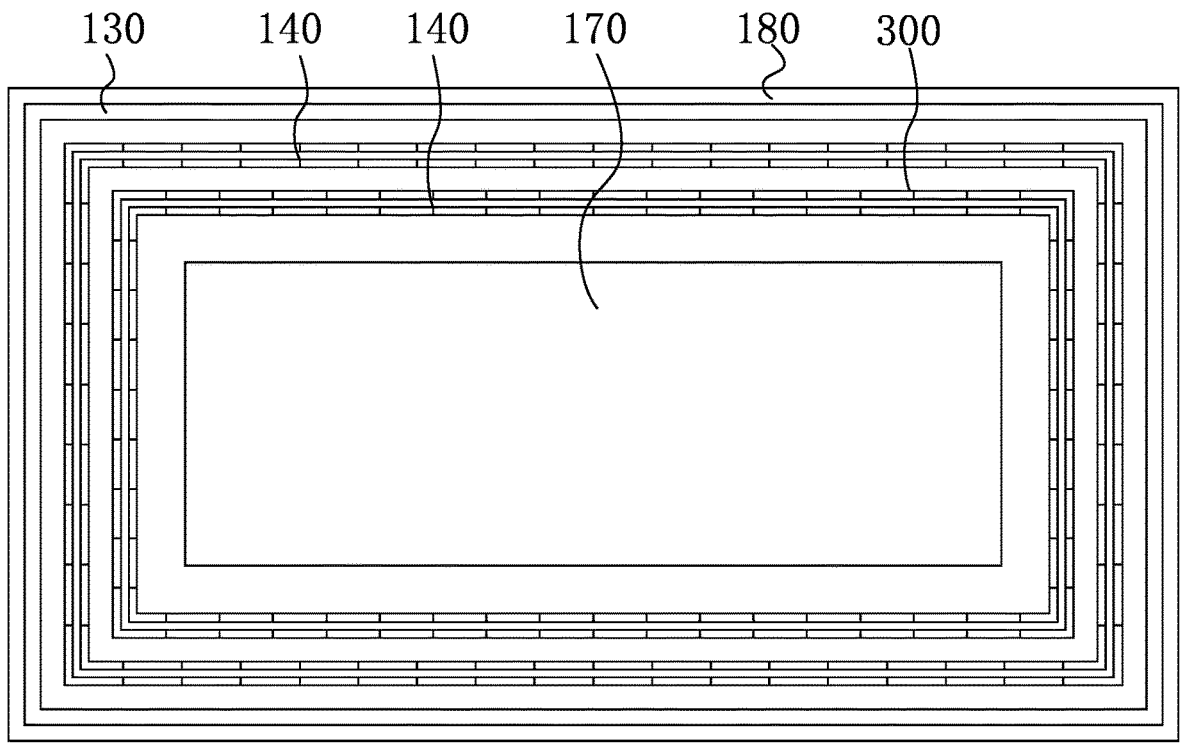
FIG. 7 is a schematic diagram of a retaining wall arrangement according to another embodiment of the present application.

As shown in FIG. 7, the retaining walls 140 are arranged around the display area 170 along the coating direction of the sealant 130 to form a plurality of circles of enclosures 300, each circle of the enclosure 300 is separated by a gap, and the three of the retaining walls 140 which are adjacent within each circle of the enclosure 300 are in a group and are respectively made of color resist materials with three different colors. By adding the enclosure 300 for blocking the flowing of the alignment liquid, next circle of enclosure 300 still plays a blocking role after the alignment liquid overflows the enclosure 300, so that the alignment liquid is effectively prevented from flowing into the sealant 130 area to make the sealant 130 fall off. The higher retaining wall 140 and the lower retaining wall 140 within different circles of the enclosures 300 are arranged at corresponding positions, and the higher retaining wall 140 corresponds to a notch formed by the lower retaining wall 140, further blocking the overflowing of the alignment liquid.

Figure 8:
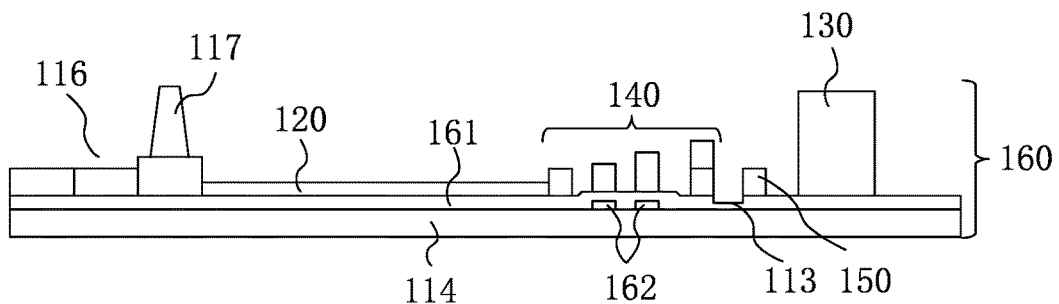
FIG. 8 is a schematic cross-sectional diagram of a substrate according to an embodiment of the present application.

As shown in FIG. 8, in one embodiment, the display panel 100 includes an array substrate 160, the array substrate 160 includes a substratum 114, a metal layer 162, an insulating layer 161, an alignment layer 120, and a plurality of retaining walls 140, the metal layer 162 is arranged on the substratum 114, the insulating layer 161 covering the metal layer 162 is arranged on the substratum 114, the retaining walls 140 with different heights are arranged on the insulating layer 161 of the array substrate 160, the array substrate 160 further includes a color resist layer 116, the color resist layer 116 includes color resists with different colors, the retaining walls 140 are made of the same material as the color resist layer 116, and the retaining walls 140 are formed with different heights by arranging the retaining walls 140 above the metal layer 162 and stacking the color resists.

The method of using the metal layer 162 to heighten the retaining walls 140 on the array substrate 160 includes arranging a plurality of retaining walls 140 with gradually increasing heights in the flowing direction of the alignment liquid, and when the alignment liquid flows to the retaining walls 140, the alignment liquid is blocked by each retaining wall, and finally arranging an additional retaining wall 150 and a groove 113 to effectively prevent the sealant 130 from falling off due to the overflowing of the alignment liquid to the sealant 130; then, when the alignment liquid overflows one of the retaining walls 140, the flow rate thereof is reduced, so that the thickness of the alignment layer 120 can not be increased due to the backflow accumulation after the alignment liquid overflows one of the retaining walls 140 at a higher flow rate, and the brightness of the display panel 100 is more uniform.

The height of the retaining walls 140 can also be increased by additionally arranging a metal layer 162 under the insulating layer 161 where the retaining walls 140 are located.

Figure 9:
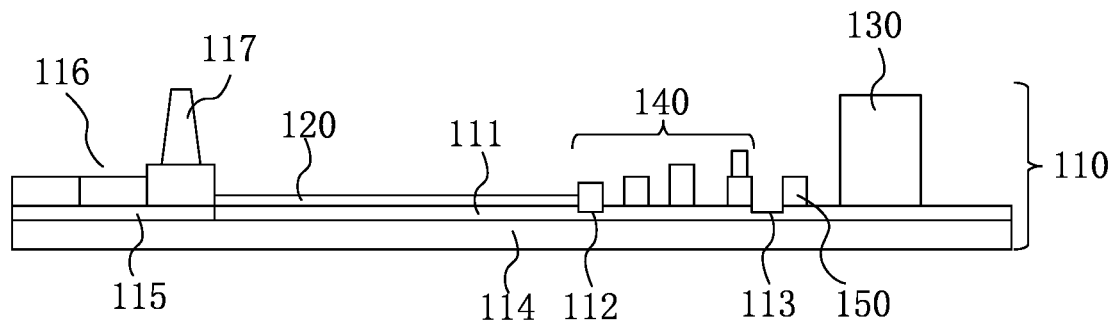
FIG. 9 is a schematic cross-sectional diagram of a substrate according to another embodiment of the present application.

As shown in FIG. 9, in one embodiment, the display panel includes a color filter substrate 110, the color filter substrate 110 includes a shading layer 111, a substratum 114, a sealant 130, an alignment layer 120, and a plurality of retaining walls 140, the shading layer 111 is arranged on a non-display area 180 of the substratum 114, the shading layer 111 includes a recess 112, the alignment layer 120 is arranged on the color filter substrate 110, the sealant 130 is arranged on the color filter substrate 110 and configured to seal the display panel 100, the plurality of retaining walls 140 are arranged on the shading layer 111 of the color filter substrate 110 and are configured to prevent an alignment liquid from overflowing, and a space is formed between the plurality of retaining walls 140, the plurality of retaining walls 140 are arranged perpendicular to the coating direction of the sealant 130, the plurality of retaining walls 140 have an increasing height along the flowing direction of the alignment liquid, and the first one of the retaining walls 140 is arranged in the recess 112.

The plurality of retaining walls 140 are arranged on the color filter substrate 110, and part of the retaining walls 140 are arranged in the recess 112, so that the retaining walls 140 have an increasing height along the flowing direction of the alignment liquid, and when the alignment liquid flows to the retaining walls 140, the alignment liquid is blocked by each retaining wall, which effectively prevent the sealant 130 from falling off due to the overflowing of the alignment liquid to the sealant 130; then, when the alignment liquid overflows one of the retaining walls 140, the flow rate thereof is reduced, so that the thickness of the alignment layer 120 can not be increased due to the backflow accumulation after the alignment liquid overflows one of the retaining walls 140 at a higher flow rate, and the brightness of the display panel 100 is more uniform.

The plurality of the retaining walls 140 may also be arranged in a plurality of the recesses 112, and the recesses 112 have a gradually decreasing depth along the flowing direction of the alignment liquid. The retaining walls 140 with different heights are formed in the above manner, and the recesses 112 play a fixation role for the retaining walls 140, so as to increase stress strength of the retaining walls 140.

Figure 10:
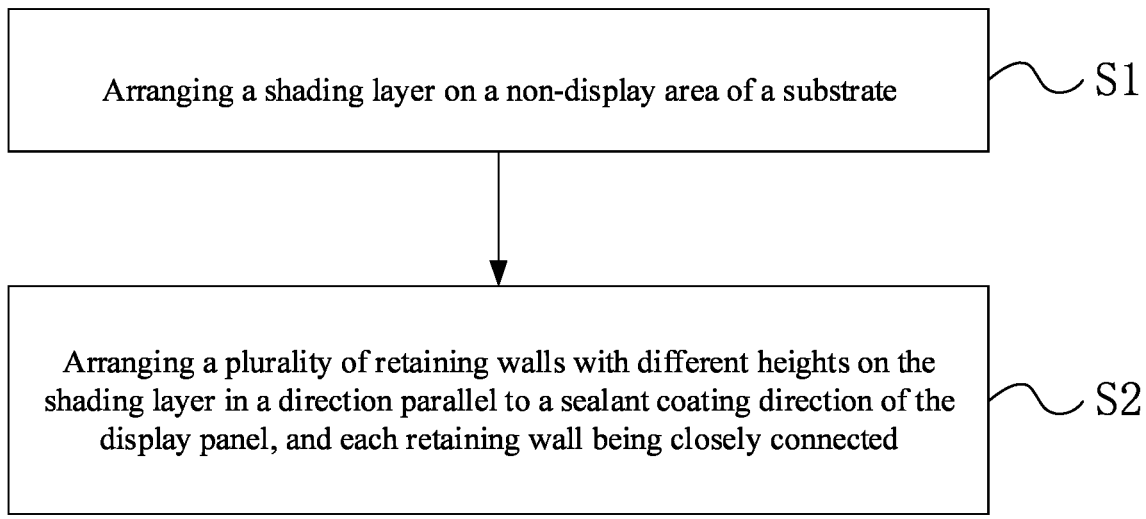
FIG. 10 is a schematic flowchart of a manufacturing method for a substrate according to an embodiment of the present application.

As shown in FIG. 10, as another embodiment of the present application, a manufacturing method for a substrate is disclosed:

S1: arranging a shading layer on a non-display area of a substratum; and

S2: arranging a plurality of retaining walls with different heights on the shading layer in a direction parallel to a sealant coating direction of a display panel, where the plurality of retaining walls are connected in a laminated manner.

It should be noted that, the limitation of the steps involved in this solution, without affecting the implementation of the specific solution, is not determined to limit the sequence of steps, and the previous steps may be executed first, later, or even simultaneously, and shall be deemed to fall within the scope of the present application as long as the solution can be implemented.

The technical solution of the present application can be widely used in various display panels, such as Twisted Nematic (TN) display panels, and In-Plane Switching (IPS) display panels.

The above content is a further detailed description of the present application in conjunction with specific, optional embodiments, and it is not to be construed that specific embodiments of the present application are limited to these descriptions. For those of ordinary skill in the art to which this application belongs, a number of simple derivations or substitutions may be made without departing from the spirit of this application, all of which shall be deemed to fall within the scope of this application.

What is claimed is:
1. A substrate of a display panel, comprising:
a substratum;
a shading layer arranged on the substratum and located in a non-display area of the substratum; and a plurality of retaining walls arranged on the shading layer in a direction parallel to a sealant coating direction of the display panel, wherein the plurality of retaining walls are connected in a laminated manner, and any two adjacent retaining walls in a direction in which the retaining walls are arranged have different heights;

wherein the substrate comprises a black matrix and a color resist layer, the black matrix is arranged within a display area of the substratum, the color resist layer is arranged on the black matrix, each of the plurality of retaining walls comprises a lower layer structure, the lower layer structure and the color resist layer are made of the same material, and the color resist layer comprises color resists with different colors;

wherein three of the retaining walls are in a group and are respectively made of color resist materials with three different colors, and the retaining walls are arranged in a circle around the display area along the sealant coating direction;

wherein the plurality of retaining walls in each group have an increasing or decreasing height along the sealant coating direction; and wherein the lower layer structure of the plurality of retaining walls in each group is arranged sequentially with a red color resist, a green color resist and a blue color resist along the sealant coating direction, wherein the blue color resist has a larger height than the green color resist, and the green color resist has a larger height than the red color resist.

2. The substrate of the display panel according to claim 1, wherein the substrate comprises a support column arranged on the black matrix, each of the plurality of retaining walls comprises an upper layer structure stacked on a surface of the lower layer structure, and the upper layer structure and the support column are made of the same material.

3. The substrate of the display panel according to claim 2, wherein the lower layer structure has a larger height than the upper layer structure.

4. The substrate of the display panel according to claim 2, wherein the upper layer structure has a smaller thickness than the lower layer structure, and a thickness direction is perpendicular to the sealant coating direction.

5. The substrate of the display panel according to claim 2, wherein the upper layer structure has an equal thickness to the lower layer structure, and the thickness direction is perpendicular to the sealant coating direction.

6. The substrate of the display panel according to claim 2, wherein the upper layer structure has an equal width to the lower layer structure, and a width direction is the sealant coating direction.

7. The substrate of the display panel according to claim 1, wherein each of the plurality of retaining walls comprises an upper layer structure stacked on the surface of the lower layer structure, and the upper layer structure and the lower layer structure are made of the same material.

8. The substrate of the display panel according to claim 1, wherein the plurality of retaining walls are arranged around the display area along the sealant coating direction to form a plurality of circles of enclosures, each circle of the enclosure is separated by a gap, and three of the retaining walls which are adjacent within each circle of the enclosure are in a group and are respectively made of color resist materials with three different colors.

9. The substrate of the display panel according to claim 8, wherein a higher retaining wall and a lower retaining wall within different circles of the enclosures are arranged at corresponding positions, and the higher retaining wall corresponds to a notch formed by the lower retaining wall.

10. A manufacturing method for a substrate, comprising steps of:
arranging a shading layer on a non-display area of a substratum; and
arranging a plurality of retaining walls with different heights on the shading layer in a direction parallel to a sealant coating direction of a display panel, wherein each of the plurality of retaining walls are connected in a laminated manner;

wherein the substrate comprises a black matrix and a color resist layer, the black matrix is arranged within a display area of the substratum, the color resist layer is arranged on the black matrix, each of the plurality of retaining walls comprises a lower layer structure, the lower layer structure and the color resist layer are made of the same material, and the color resist layer comprises color resists with different colors;

wherein three of the retaining walls are in a group and are respectively made of color resist materials with three different colors, and the retaining walls are arranged in a circle around the display area along the sealant coating direction;

wherein the plurality of retaining walls in each group have an increasing or decreasing height along the sealant coating direction; and wherein the lower layer structure of the plurality of retaining walls in each group is arranged sequentially with a red color resist, a green color resist and a blue color resist along the sealant coating direction, wherein the blue color resist has a larger height than the green color resist, and the green color resist has a larger height than the red color resist.

11. A display device, comprising a sealant and a substrate of a display panel; the substrate comprising:
a substratum;
a shading layer arranged on the substratum and located in a non-display area of the substratum; and
a plurality of retaining walls arranged on the shading layer in a direction parallel to a sealant coating direction of the display panel, wherein the plurality of retaining walls are connected in a laminated manner, and any two adjacent retaining walls in a direction in which the retaining walls are arranged have different heights;

wherein the substrate comprises a color filter substrate and an array substrate, and the color filter substrate and the array substrate are paired by the sealant;

wherein the substrate comprises a black matrix and a color resist layer, the black matrix is arranged within a display area of the substratum, the color resist layer is arranged on the black matrix, each of the plurality of retaining walls comprises a lower layer structure, the lower layer structure and the color resist layer are made of the same material, and the color resist layer comprises color resists with different colors;

wherein three of the retaining walls are in a group and are respectively made of color resist materials with three different colors, and the retaining walls are arranged in a circle around the display area along the sealant coating direction;

wherein the plurality of retaining walls in each group have an increasing or decreasing height along the sealant coating direction; and wherein the lower layer structure of the plurality of retaining walls in each group is arranged sequentially with a red color resist, a green color resist and a blue color resist along the sealant coating direction, wherein the blue color resist has a larger height than the green color resist, and the green color resist has a larger height than the red color resist.

12. The display device according to claim 11, wherein the substrate further comprises a support column arranged on the black matrix, each of the plurality of retaining walls further comprises an upper layer structure in addition to the lower layer structure, wherein the color resist layer comprises color resists with different colors, the upper layer structure is stacked on a surface of the lower layer structure, and the upper layer structure and the support column are made of the same material.

13. The display device according to claim 12, wherein the upper layer structure has a smaller thickness than the lower layer structure, and a thickness direction is perpendicular to the sealant coating direction.

14. The display device according to claim 12, wherein the upper layer structure has an equal width to the lower layer structure, and a width direction is the sealant coating direction.

* * * * *